W. C. DAVIS & J. MILLER.
HIDE STRETCHER.
APPLICATION FILED APR. 16, 1913.
1,081,584.
Patented Dec. 16, 1913.
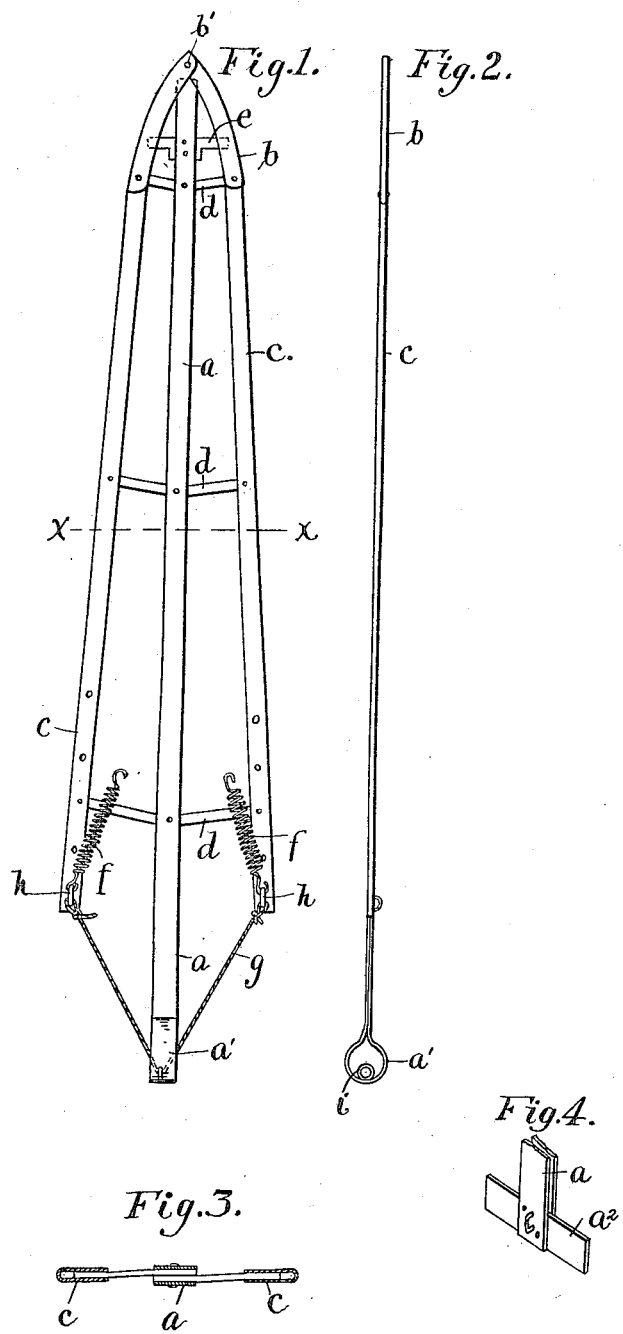
Witnesses:
B. M. Newell
C. B. Creighton
Inventors:
William C. Davis
John Miller
by S. W. Bates
Atty.

UNITED STATES PATENT OFFICE.

WILLIAM C. DAVIS AND JOHN MILLER, OF FREEPORT, MAINE, ASSIGNORS, BY DIRECT AND MESNE ASSIGNMENTS, OF ONE-HALF TO SAID MILLER, AND ONE-HALF TO WILLIAM K. SANDERSON, OF PORTLAND, MAINE.

HIDE-STRETCHER.

1,081,584.  Specification of Letters Patent.  Patented Dec. 16, 1913.

Application filed April 16, 1913. Serial No. 761,439.

*To all whom it may concern:*

Be it known that we, WILLIAM C. DAVIS and JOHN MILLER, citizens of the United States, of Freeport, in the county of Cumberland and State of Maine, have invented certain new and useful Improvements in Hide-Stretchers, of which the following is a specification.

Our invention relates to a frame for stretching the hides of fur bearing animals which are stripped from the animal. Hides of this character are ordinarily stretched on stretchers formed of thin pieces of wood cut to approximately fit the inside of the hide. The difficulty with these stretchers is to get them to fit the inside of the hide perfectly so that the skin will dry out smoothly. Another difficulty with these board stretchers is the fact that they are liable to heat and spoil the skin for lack of ventilation.

The object of our invention is to construct an adjustable frame which may be used to stretch hides of various sizes, which may be cheaply made, which will be light in weight and which will be well ventilated so that the air will be freely admitted to the inside.

Our invention may best be understood by reference to the accompanying drawing in which is shown a hide stretching frame constructed according to our invention.

In the drawing, Figure 1 is a plan, Fig. 2 is an edgewise view, Fig. 3 is a cross section on the line of Fig. 1, and Fig. 4 is a perspective view of a modified handle.

The stretcher is made up of a pair of side bars and a pair of end bars connected to a center bar by toggle bars which enable the side bars to be expanded and contracted by the longitudinal movement of the center bar. As here shown, the center bar $a$ is made of a piece of flat thin metal folded on the center to form a handle $a'$. The inner ends of the toggle bars $d$ are pivoted between the two parts of the center bar and their outer ends are pivoted to the side bars. The side bars $c$ and the end bars $b$ are made up of thin strips bent or folded so that they are U-shaped in cross section and the ends of the toggle bars are pivoted between the two sides of the fold. The outer ends of the end bars are pivoted together by a pivot $b'$ and the inner ends are pivoted to the ends of the side bars. One of the sets of toggle bars is connected at the point of junction of the end and side bars. The parts are so proportioned that the end of the center bar strikes against the rivet $b'$ when the toggle bars are at right angles to the center bar and the side bars at their outer positions.

For the purpose of guiding the end of the center bar and preventing it from getting bent we secure between the two parts of the center bar near the end a flat metal guide $c$ which plays in the recess of the end bars $b$ holding the end of the center bar and the end bars rigid and firm.

Means are provided for holding the frame in an expanded position less than its full expansion. For this purpose as here shown, we secure to the loops $h$ at the rear ends of the side bars a cord or other flexible member $g$, the same passing through a loop $i$ in the handle portion. The cord may be woven back and forth through these loops and securely fastened so that the frame cannot contract.

Means are provided for stretching the feet and hind legs of the animal after the hide is drawn on to the stretcher. As shown, we secure springs $f$ at some portion of the side pieces preferably at the rear ends, the free ends of these springs being provided with hooks which may be hooked into the feet of the animal to draw the same back and thus allow it to dry in the proper position with respect to the rest of the hide. Holes are provided along the side bars into which the springs $f$ may be hooked to suit different sized skins.

In Fig. 4 we have shown a modified form of handle which allows the stretcher to be more closely packed than the form shown in the other figures. In the form shown in Fig. 4, the two pieces forming the center bar are cut off instead of being bent to form a handle and a flat cross piece $a^2$ is riveted between them. This cross piece forms a bearing to be rested against the body when forcing the center bar into place.

Such a stretcher as we have described may be made of aluminum or other thin metal. Its construction is very light and strong, it may be closely packed and it will fit a considerable variety of sizes of hide without change in the size of the frame. When the skin does not require the fully expanded frame, the cord is used to secure it firmly in stretching position.

It is evident that changes may be made in the construction of our device without departing from the limits of our invention as set forth in the following claims.

We claim:—

1. A hide stretcher including a pair of side bars, a pair of end bars pivoted to said side bars and to each other, a center bar, toggle bars pivoted to said side bars and center bar and stretching springs secured to said side bars for engaging the feet of the stretched hide.

2. A hide stretcher including a pair of side bars, a pair of end bars pivoted to the side bars and to each other, a center bar, toggle bars pivoted to the center bar and the side bars and an adjustable fastening device connecting the side bars with the center bar to hold the latter in a fixed position longitudinally.

3. A hide stretcher including a pair of side bars, a pair of end bars pivoted to the side bars and to each other, a center bar having a loop therein, toggle bars pivoted to the center bar and the side bars and an adjustable fastening device for connecting the side bars with the center bar consisting of a flexible member secured to the side bars and extending through said loop.

4. A hide stretcher including a pair of side bars and a pair of end bars each made of a folded metal strip U-shape in cross section, said end bars being pivoted to the end bars and to each other, a center bar composed of two metal strips, toggle bars pivoted between the two parts of the center bar and to the side bars and means to secure the side bars and center bar from movement longitudinally with relation to each other.

5. A hide stretcher including a pair of side bars, a pair of end bars pivoted to each other and to the side bars, a center bar, toggle bars pivoted to the center bar and to the side bars, the end of the center bar abutting against the joint formed by the ends of the end bars when the toggle bars are at right angles to the center bar.

6. A hide stretcher including a pair of side bars, a pair of end bars pivoted to ends of the side bars and to each other, said side and end bars being composed of folded metal strips of U-shaped cross section, a center bar composed of two metal strips, toggle bars pivoted between the two strips of the center bar and within the folds of the side bars the ends of said center bar fitting within the folds of the end bars and a guide piece secured between the strips of the center bar and extending into the folds of the end bars on each side.

In testimony whereof we have affixed our signatures, in presence of two witnesses.

WILLIAM C. DAVIS.
JOHN MILLER.

Witnesses:
S. W. BATES,
C. B. CREIGHTON.

Copies of this patent may be obtained for five cents each, by addressing the "Commissioner of Patents Washington, D. C."